United States Patent [19]
Hass

[11] 3,768,830
[45] Oct. 30, 1973

[54] VEHICLE KNEE BAG
[75] Inventor: David P. Hass, Detroit, Mich.
[73] Assignee: Eaton Corporation, Cleveland, Ohio
[22] Filed: Sept. 23, 1970
[21] Appl. No.: 74,765

[52] U.S. Cl. .......................................... 280/150 AB
[51] Int. Cl. ............................................. B60r 21/06
[58] Field of Search .................. 280/150 AB, 150 B; 244/122 R, 122 AG; 206/DIG. 31

[56] References Cited
UNITED STATES PATENTS

| 2,834,606 | 5/1958 | Bertrand | 280/150 |
|---|---|---|---|
| 3,586,347 | 6/1971 | Carey et al. | 280/150 |
| 2,418,798 | 4/1947 | Whitmer | 280/150 X |
| 3,414,292 | 12/1968 | Oldberg et al. | 280/150 |
| 3,430,979 | 3/1969 | Terry et al. | 280/150 |
| 3,573,885 | 4/1971 | Brawn et al. | 280/150 |
| 3,582,107 | 6/1971 | Goetz | 280/150 |
| 3,610,657 | 10/1971 | Cole | 280/150 AB |
| 3,642,303 | 2/1972 | Irish et al. | 280/150 AB |

Primary Examiner—Kenneth H. Betts
Attorney—Yount & Tarolli

[57] ABSTRACT

An improved vehicle safety apparatus includes a confinement which is expanded from a collapsed condition upon the occurrence of an accident to restrain movement of an occupant of the vehicle. The confinement comprises two chambers or compartments, one of the compartments is immediately expanded to engage the legs of the occupant at or below the knee. After the first compartment has at least in part been expanded, the second compartment is expanded upwardly between the dashboard and the torso of the occupant.

7 Claims, 3 Drawing Figures

Patented Oct. 30, 1973
3,768,830
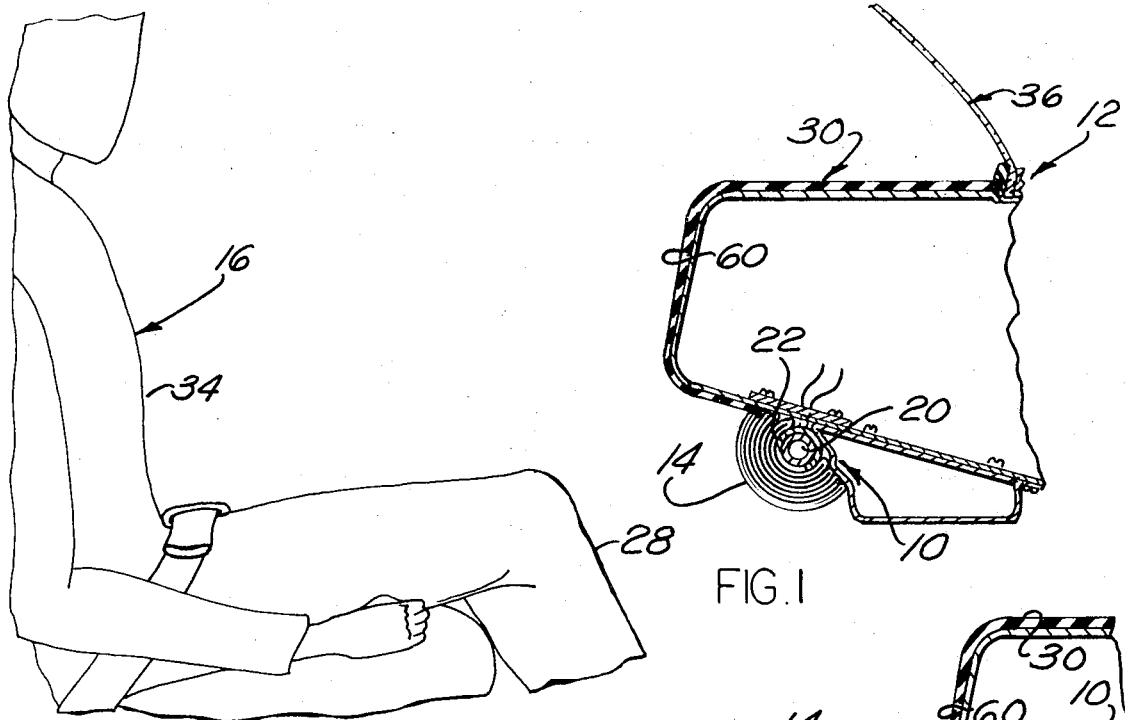
FIG.1
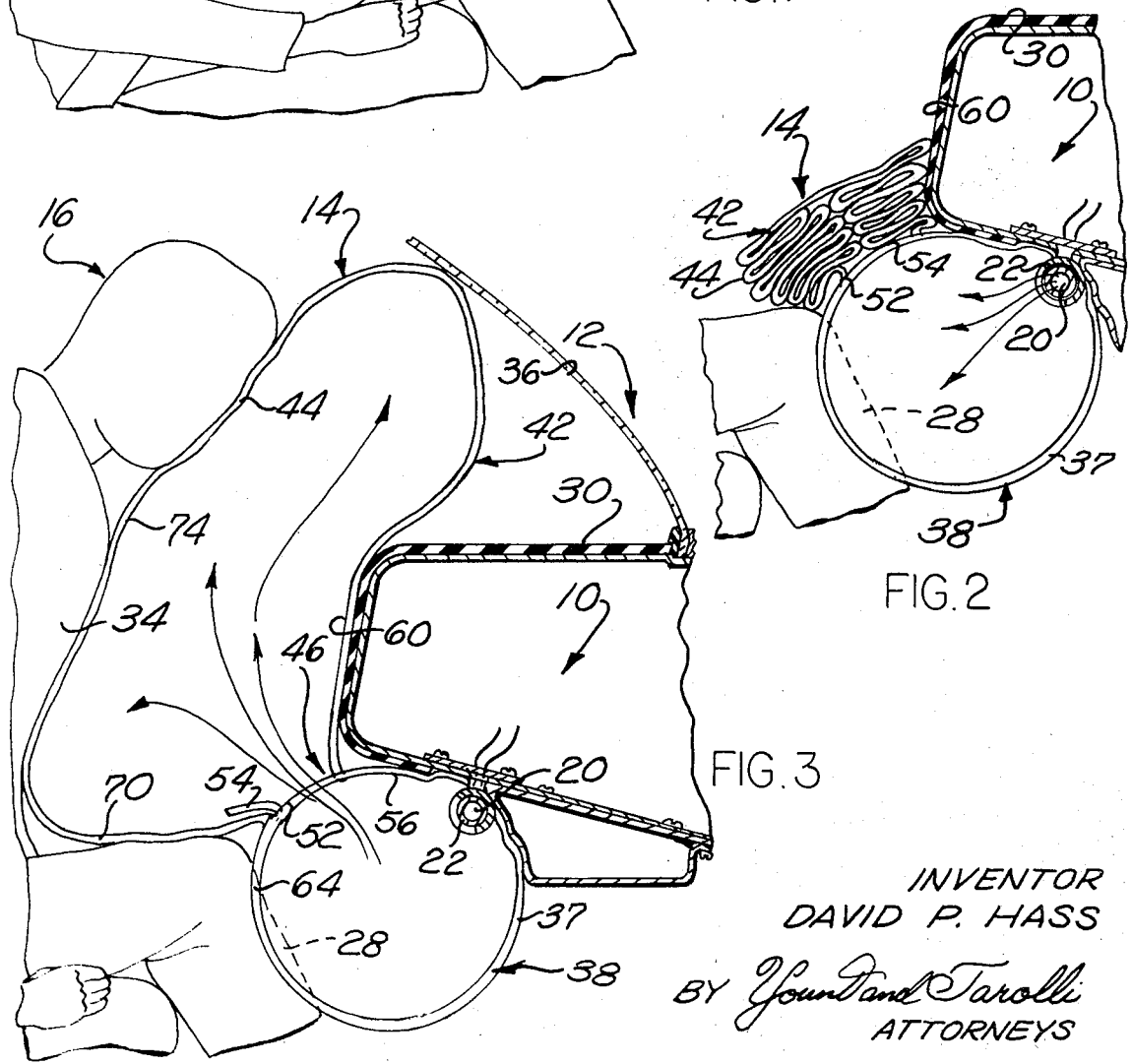
FIG.2
FIG.3
INVENTOR
DAVID P. HASS
BY Young and Tarolli
ATTORNEYS

VEHICLE KNEE BAG

The present invention relates to safety apparatus, and more particularly to a safety device which includes a confinement which is expandable to restrain movement of an occupant of a vehicle during an accident.

A known safety apparatus includes a confinement which is expanded from a collapsed inoperative condition to an expanded operative condition. When in the expanded operative condition, the confinement restrains or cushions forward movement of the occupant of the vehicle during an accident. The confinement is inflated between the occupant and a structural part of the vehicle which the occupant might engage upon movement of the occupant and thereby the confinement prevents forceful impact of the occupant against the structural part.

Much research and development work have been directed to the design of such a safety device with the primary consideration in all of the work being the protection of the occupant. The present invention is directed to a further improvement in such safety devices, again with the primary consideration being the complete protection of the occupant of the vehicle during a collision. The primary purpose of the present invention is to provide complete protection for the occupant, particularly an occupant of the front seat of the vehicle, by having a portion of the confinement, or a compartment of the confinement, engage the leg of the occupant prior to a further portion of the confinement engaging the torso of the occupant. Engagement of a portion of the leg of the front seat occupant with the confinement tends to minimize the possibility of the occupant sliding downwardly and forwardly under the dashboard of the vehicle. Thus, the present invention, while incorporating all of the advantages of the safety devices heretofore developed, provides this additional protection, due to the fact that a portion of the confinement engages the leg of the occupant prior to the engagement of the remaining portion of the confinement with the torso of the occupant.

Accordingly, it is an object of this invention to provide a new and improved vehicle safety apparatus including a confinement which expands upon the occurrence of an accident in such a manner as to provide a protective retraint for an occupant of the vehicle and restrains movement of the occupant in a manner not heretofore achieved.

Another object of this invention is to provide a new and improved safety apparatus which includes confinement means having a portion for restraining the movement of the legs of the occupant of a vehicle and another portion for restraining movement of the torso of the occupant of the vehicle and wherein the confinement is expanded in such a manner that the leg restraining portion is expanded into engagement with the legs of the occupant prior to expansion of the torso restraining portion of the confinement.

Another object of this invention is to provide a new and improved vehicle saftey apparatus which includes a confinement having a wall which defines a first compartment or chamber for engaging the legs of an occupant of the vehicle and a second compartment or chamber for engaging the torso of an occupant upon expansion of the confinement and wherein a means is provided to effect expansion of the first compartment prior to expansion of the second compartment.

Another object of this invention is to provide a new and improved safety apparatus having a confinement which is divided into a plurality of compartments and a means for effecting expansion of a first chamber of the confinement into engagement with the legs of an occupant of the vehicle to thereby restrain the occupant against moving forwardly and downwardly beneath the confinement and for thereafter effecting expansion of the second chamber of the confinement into engagement with the torso of the occupant of the vehicle to further restrain the occupant of the vehicle against movement.

These and other objects and features of the invention will become more apparent upon a consideration of the following description taken in connection with the accompanying drawings wherein:

FIG. 1 is a schematic illustration of a safety apparatus constructed in accordance with the present invention and mounted beneath the dashboard of a vehicle;

FIG. 2 is a schematic illustration depicting a confinement of the safety apparatus of FIG. 1 in a partially expanded condition in which a lower compartment or chamber of the confinement is expanded to restrain movement of the legs of an occupant of the vehicle; and FIG. 3 is a schematic illustration depicting the confinement in a fully expanded condition in which an upper compartment or chamber is expanded to restrain movement of the torso of the occupant of the vehicle.

The present invention relates to a safety apparatus 10 which may be employed in various types of vehicles, including automobiles, trucks, airplanes and the like. For purposes of illustration, the safety apparatus 10 is illustrated in association with an automobile 12. The safety apparatus 10 includes confinement means 14 which is expandable from the collapsed condition of FIG. 1 to the expanded condition of FIG. 3 to restrain movement of an occupant 16 of the vehicle 12 during an accident. A suitable sensor assembly (not shown) is connected with the safety apparatus 10 and is operative to detect the occurrence of an accident and to thereupon activate the safety apparatus to effect expansion of the confinement 14.

The safety apparatus 10 includes a means for providing a flow of fluid to inflate the confinement 14 from the collapsed condition to the expanded condition. In the present instance, this flow of fluid is provided by opening a reservoir 20 containing fluid under pressure. To open the reservoir 20, the sensor assembly detonates an explosive charge (not shown) upon the occurrence of an accident. High pressure fluid then flows through the opening in the reservoir into a diffuser 22 which directs the flow of fluid into the confinement 14. The specific construction of the sensor assembly, diffuser 22, and reservoir 20 are, per se, known and may take the form disclosed in U.S. Pat. No. 3,414,292 to Oldberg et al. However, it is contemplated that sources of fluid other than the container 20 of fluid under pressure can be associated with the confinement 14 to effect inflation thereof.

In accordance with the present invention, the confinement means 14 is expanded into engagement with the legs 28 of the occupant 16 to apply a restraining force to the legs of the occupant to assist in restraining the occupant against moving forwardly and downwardly beneath the dashboard 30 of the vehicle 12. The confinement means 14 is then expanded into engagement with the torso 34 of the occupant 16 to restrain him against forward movement into engagement with the dashboard 30 or windshield 36 of the vehicle under the influence of collision forces.

To restrain the occupant 16 against moving forwardly and downwadly under the influence of collision forces, the confinement means 14 includes a wall 37 defining a lower compartment or portion 38 (FIG. 2) which is expanded rearwardly into engagement with the legs 28 of the occupant 16 at or below the knee. Since the compartment 38 has a relatively small volume, it is quidkly inflated upon the occurence of an accident to the expanded condition by a flow of fluid from the reservoir 20. An upper compartment or portion 42 (FIG. 3) is defined by a wall 44 which is expanded into engagement with the torso 34 of the occupant to further restrain the occupant against forward movement under the influence of collision forces. By restraining movement of the legs 28 of the occupant with the lower chamber 38 of the confinement 14 before effecting expansion of the chamber 42, the occupant 16 is restrained against moving forwardly and downwardly beneath the confinement 14 while the relatively large compartment 42 is being expanded.

To effect a sequential expansion of the compartments of the confinement means 14 from the collapsed condition of FIG. 1 to the partially expanded condition of FIG. 2 and then to the fully expanded condition of FIG. 3, a plurality of pressure responsive valves 46 (only one of which is shown) are provided to control the flow of fluid from the compartment 38 to the compartment 42. The valves 46 are initially in a closed condition blocking a flow of fluid through openings 52 connecting the compartment 38 in fluid communication with the compartment 42. Upon the occurrence of an accident a flow of fluid from the reservoir 20 initiates expansion of the chamber 38.

When the chamber 38 is inflated to the expanded condition (FIG. 2) and the fluid pressure within the chamber has reached a predetermined minimum pressure, the pressure responsive valves 46 are operated to an open condition to enable fluid to flow from the compartment 38, through the openings 52, into the compartment 42. To provide for this opening of the valves 46, each of the valves includes a burstable valve element or blow-out patch 54 which is substantially weaker than the wall 37 of the compartment 38. Therefore, the blow-out patch 54 is ruptured under the influence of a predetermined fluid pressure within the compartment 38 to effect operation of the valve assemblies 46 to the open condition of FIG. 3. Once the valves 46 have been opened, fluid can flow through the passages 52 from the compartment 38 to the compartment 42.

The compartment 42 is expanded into engagement with the torso 34 of the occupant 16 to further restrain the occupant against forward movement while the legs 28 of the occupant are being restrained by the compartment 38 of the confinement 14. Thus, the chamber 38 restrains the legs 28 of the occupant against moving forwardly while the chamber 42 is being expanded. Therefore, the occupant cannot deflect the confinement 14 upwardly, when it is in a partially expanded condition and slide under confinement into engagement with the dashboard 30 of the vehicle 12.

The safety apparatus 10 is advantageously mounted beneath the dashboard 30 of the vehicle so that the compartment 38 of the confinement can be quickly expanded into engagement with legs 28 of the occupant 16. As the compartment 38 is expanded into engagement with the legs 28 of the occupant 16, the collapsed compartment 42 is moved beyond a rearward edge portion 60 of the dashboard 30 (FIG. 2) so that the compartment 42 is free to expand upwardly and rearwardly into engagement with the torso 34 of the occupant and the rearward edge portion 60 of the dashboard 30. Thus, expansion of the compartment 38 moves the collapsed compartment 42 from a storage position (FIG. 1) in which expansion of the compartment 42 would be hindered by the dashboard 30 to a rearward position in which the compartment 42 is at least partially rearwardly of the dashboard 30 (FIG. 2) so that the compartment is free to expand upwardly and rearwardly under the influence of fluid pressure within the compartment (FIG. 3).

Once the compartments 38 and 42 have been expanded, the confinement 14 will restrain the occupant 16 against moving straight forwardly against the dashboard 30 and against sliding forwardly and downwardly under the confinement. Thus, a rearward surface 64 of the compartment 38 engages the legs of the occupant 16 below the knee to keep the legs from moving forwardly and downwardly. A lower surface 70 of the compartment 42 engages the upper or thigh portion of the legs 28 of the occupant to restrain the legs against upward movement. An upwardly extending rearward surface 74 of the compartment 42 engages the torso 34 of the occupant 16 to restrain him against movement into engagement with the dashboard 30 and windshield 36. If desired, a known blow-out patch assembly can be provided in the confinement 14 to enable fluid to be exhausted from the confinement to minimize rebound of the occupant therefrom.

In view of the foregoing description, it is apparent that the safety apparatus 10 includes a confinement means 14 having a first compartment or chamber 38 which is expandable into engagement with the legs of the occupant of the vehicle and a second compartment or chamber 42 which is expandable into engagement with the torso of the occupant. The valve assemblies 46 effect a sequential expansion of the confinement 14 in such a manner that the lower chamber 38 is expanded into engagement with the legs of the occupant of the vehicle before the upper chamber 42 of the confinement 14 engages the torso of the occupant of the vehilce. This results in the occupant of the vehicle being effectively restrained against movement as a result of a collision.

Having described a specific preferred embodiment of the invention, the following is claimed:

1. Safety apparatus for protecting an occupant of a vehicle during an accident, said safety apparatus comprising a confinement means expandable from a collapsed condition to an expanded condition in which said confinement means is adapted to restrain movement of the occupant of the vehicle, said confinement means including means defining a first compartment positioned to engage the legs of the occupant at, or below, the knee upon expansion of the confinement means to the expanded condition, and means defining a second compartment fluidically in series with said first compartment for engaging the torso of the occupant upon expansion of the confinement means to the expanded condition, means for effecting expansion of the confinement means to the expanded condition including means for providing a flow of fluid in response to the occurrence of an accident, and means for initiating expansion of said first compartment prior to initiation of expansion of said second compartment and including control means which initially blocks fluid flow into said second compartment and in response to the presence of a predetermined fluid pressure in said first compartment and enables fluid to flow into said second compartment whereby said first compartment may be effective to maintain said occupant in seated position during expansion of said second compartment.

2. Safety apparatus as set forth in claim 1 wherein said means for controlling the flow of fluid includes burstable means which initially blocks fluid flow into said second compartment and bursts in response to the presence of a predetermined fluid pressure in said first compartment to enable fluid to flow into said second compartment.

3. Safety apparatus as set forth in claim 2 wherein said burstable means is located in a portion of a wall which is disposed between said first and second compartments and which in part defines said first and second compartments.

4. Safety apparatus as set forth in claim 1 further including means for supporting said confinement means in the collapsed condition beneath the dashboard of the vehicle.

5. Safety apparatus as set forth in claim 4 wherein at least a portion of said second compartment is located rearwardly of the dashboard of the vehicle when said confinement means is in the expanded condition.

6. Safety apparatus as set forth in claim 1 wherein said confinement means comprises an outer wall means and an inner wall dividing the chamber defined by the outer wall means into said first and second compartments.

7. The invention of claim 1 wherein said first compartment is much smaller than said second compartment whereby said first compartment may be rapidly inflated to thereby engage the occupant's legs at or below the knee as early in the collision sequence as practicable.

* * * * *